United States Patent [19]

Stattel et al.

[11] 4,298,987
[45] Nov. 3, 1981

[54] MEMORY-BASED FRAME SYNCHRONIZER

[75] Inventors: Raymond J. Stattel, Lanham; James K. Niswander, Silver Spring, both of Md.

[73] Assignee: The United States of America as represented by the Administrator, National Aeronautics and Space Administration, Washington, D.C.

[21] Appl. No.: 129,779

[22] Filed: Mar. 12, 1980

[51] Int. Cl.³ .......................... H04J 3/06; H04J 6/00
[52] U.S. Cl. .................................. 375/106; 375/114; 375/116; 370/100
[58] Field of Search ............................ 370/100–108; 375/106, 114, 116; 371/46, 47; 340/147 SY, 814, 681

[56] References Cited

U.S. PATENT DOCUMENTS

| | | | |
|---|---|---|---|
| 3,903,371 | 9/1975 | Colton | 375/116 |
| 3,920,921 | 11/1975 | Pitroda | 370/100 |
| 4,131,763 | 12/1978 | Herschtal | 370/100 |
| 4,158,107 | 6/1979 | Nicholas | 370/102 |

Primary Examiner—Benedict V. Safourek
Assistant Examiner—Stephen Chin
Attorney, Agent, or Firm—Ronald F. Sandler; John R. Manning; John O. Tresansky

[57] ABSTRACT

The memory-based frame synchronizer comprises a serial-to-parallel converter which converts a serial input data stream to a constantly changing parallel data output. This parallel data output is supplied to programmable sync word recognizers each consisting of a multiplexer (18, 20, 22) and a random access memory (RAM) (38, 40, 42). The multiplexer is connected to both the parallel data output and an address bus (24) which may be connected to a microprocessor or computer for purposes of programming the sync word recognizer. The RAM is used as an associative memory or decoder and is programmed with the pattern of binary 1's and 0's necessary to identify a specific sync word. The RAM produces an output when the address supplied by the multiplexer corresponds to the specific sync word. Additional RAMs (62, 76, 78) are used as counter decoders to define word bit length, frame word length, and paragraph frame length. These RAMs have their address lines connected to a bit counter (50) and a word counter (66) by respective multiplexers (52, 70) which also connect the RAM address lines to the address bus (56). Thus, the counter decoder RAMs are also programmable to define the parameters or word bit length, frame word length, and paragraph frame length. The outputs of the recognizer RAMs and the counter decoder RAMs are connected to mode control and decoding logic (96, 98). There are three processing modes: the search mode in which there is a lack of coincidence between the sync outputs of the recognizer and counter decoder RAMs; the check mode in which there has been at least one coincidence but less than in successive coincidences between the sync outputs of the recognizer and counter decoder RAMs; and the lock mode in which there have been in successive coincidences between the sync outputs of the recognizer and counter decoder RAMs. The programmable RAMs permit dynamic and real time changes in formats under software control.

4 Claims, 6 Drawing Figures

MEMORY-BASED FRAME SYNCHRONIZER

ORIGIN OF THE INVENTION

The invention described herein was made by employees of the United States Government and may be manufactured and used by or for the government for governmental purposes without the payment of royalties thereon or therefor.

TECHNICAL FIELD

The present invention generally relates to digital communications systems, and more particularly to synchronization circuits for use in such communications systems.

BACKGROUND ART

In digital communications systems, data are transmitted serially. It is therefore necessary to convert the data to parallel format at the receiver. To facilitate this conversion, sync words are inserted in the data stream to define data words, frames and subframes or paragraphs. These sync words are sometimes called unique words because their patterns of binary 1's and 0's are highly self-correlative and therefore readily recognizable. The process of recognizing the sync words and converting the serial data stream to parallel format is known as frame synchronization.

Frame synchronizers have in the past comprised a serial-to-parallel converter, sync word comparators, and various counters and logic control circuits. The serial-to-parallel converter is typically a serial-in, parallel-out shift register clocked by clock pulses regenerated from or synchronized with the incoming serial data stream. The parallel output of the shift register is connected to one or more sync word comparators. These are hard wired devices designed to compare the constantly changing parallel data output from the shift register with a single, predetermined unique word and to provide an output when a match occurs. To provide some flexibility, the unique word pattern can be supplied to the comparator by discrete switches, a patch panel or a latched register. The output from the comparator is used to gate the parallel output from the shift register into a buffer register and/or supply counting pulses to a counter which defines word and frame periods. The outputs from the sync word comparators are counted by counters which, by means of hard wired decoding logic, provide outputs when predetermined counts occur defining word bit length, frame word length and subframe word length.

While the prior art frame synchronizers have performed their function extremely well, their major disadvantage is that changes in data format necessitate cumbersome and expensive equipment changes.

It is therefore an object of the present invention to provide a frame synchronizer wherein data formats can be easily and dynamically changed.

It is another object of the invention to use memory array elements to provide increased flexibility in format selection and sync word selection in addition to real time reconfiguration ability in a frame synchronizer.

STATEMENT OF THE INVENTION

The foregoing and other objects of the invention are accomplished by using programmable memory arrays to perform the functions of sync word recognizers and counter decoding logic. More specifically, a serial-to-parallel converter converts the serial data stream to a constantly changing parallel data output. This parallel data output is supplied to at least one sync word recognizer consisting of a multiplexer and a random access memory (RAM). The multiplexer is connected to both the parallel data output and an address bus which may be connected to a microprocessor or computer for purposes of programming the sync word recognizer. The RAM is used as an associative memory or decoder and is programmed with the sync word. The RAM produces an output when the address supplied by the multiplexer corresponds to the programmed sync word. Additional RAMs are used as counter decoders to define word bit length, frame word length, and paragraph frame length. These RAMs have their address lines connected to a bit counter and a word counter by respective multiplexers which also connect the RAM address lines to the address bus. Thus, the counter decoder RAMs are also programmable to define the parameters of word bit length, frame word length, and paragraph frame length. The outputs of the recognizer RAMs and the counter decoder RAMs are connected to mode control and decoding logic. There are three processing modes: the search mode in which there is a lack of coincidence between the sync outputs of the recognizer and counter decoder RAMs; the check mode in which there has been at least one coincidence but less than n successive coincidences between the sync outputs of the recognizer and counter decoder RAMs; and the lock mode in which there have been n successive coincidences between the sync outputs of the recognizer and the counter decoder RAMs.

BRIEF DESCRIPTION OF THE DRAWINGS

The specific nature of the invention, as well as other objects, aspects, uses and advantages thereof, will clearly appear from the following description with reference to the accompanying drawings, in which.

DETAILED DESCRIPTION OF THE INVENTION

Figure 1:
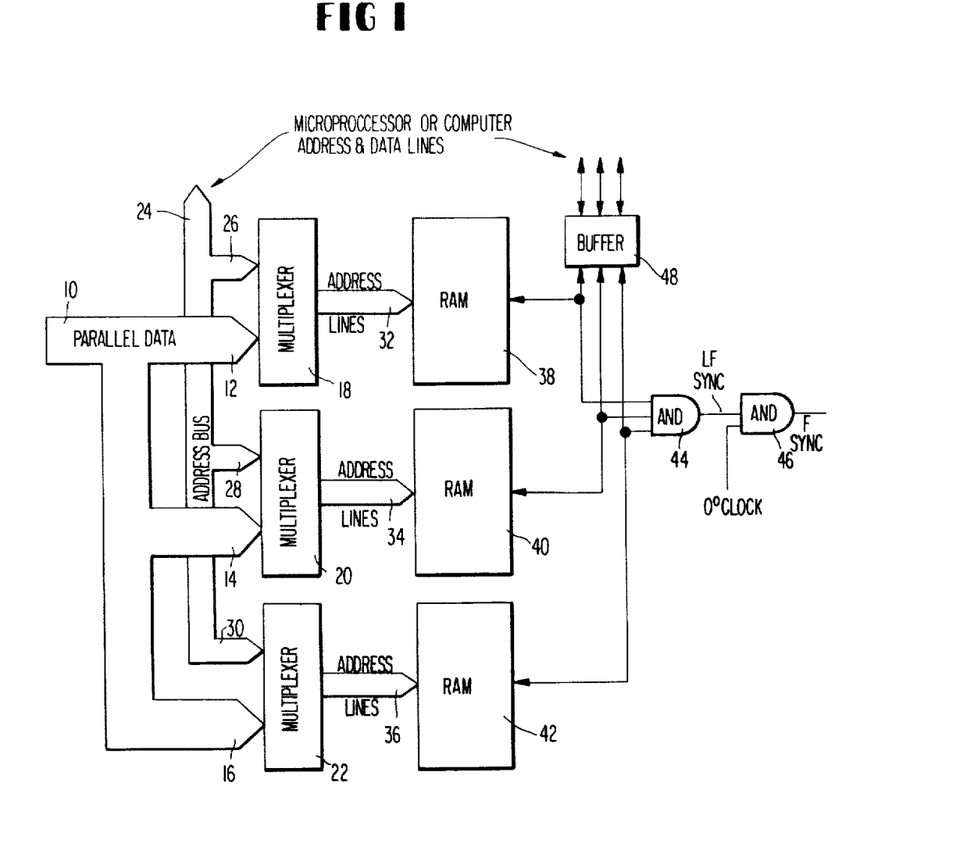
FIG. 1 is a block diagram of the sync word recognizer, which forms a part of the memory-based frame synchronizer, according to the invention.

Referring now to the drawings, and more particularly to FIG. 1, there is shown a sync word recognizer wherein a 30-bit parallel data bus 10 is divided into three 10-bit parallel data busses 12, 14 and 16 to supply one set of inputs to multiplexers 18, 20 and 22, respectively. The parallel data on bus 10 is provided in a conventional manner by a serial-to-parallel converter. More specifically, serial data is derived from two input signals: an NRZ-L DATA signal and a 0°CLOCK signal shown in FIGS. 5 and 6 and available from any commerical bit synchronizer. A high level of the NRZ-L DATA signal at the high-to-low transition of the O°-CLOCK is interpreted as a binary "1" while a low level at that time is interpreted as a binary "0". On each negative-going edge of the O°CLOCK, the NRZ-L DATA is clocked into a 30-bit long shift register which provides a parallel output to data bus 10.

The multiplexers 18, 20 and 22 may each be composed of ten 2-to-1 data multiplexers, integrated circuit 74LS257. The other set of inputs to the multiplexers 18, 20 and 22 is supplied by an address bus 24. The address bus 24 may also be a 30-bit parallel bus divided into three 10-bit parallel buses 26, 28 and 30 to supply the other set of inputs to multiplexers 18, 20 and 22, respectively. Alternatively, a 10-bit address bus may be connected in common to each of the multiplexers and data supplied in three serial bytes of 10 parallel bits each as will become more apparent as the description proceeds. In either case, the address bus 24 is connected to a microprocessor, computer, or other data processing device.

The multiplexers 18, 20 and 22 each provide outputs to 10-bit parallel address lines 32, 34 and 36, respectively. These address lines are connected to the address inputs of respective ones of random access memories (RAMs) 38, 40 and 42. Preferably, these RAMs are INTEL 2102 integrated circuits organized as 1 bit by 1024 words accessed by a 10-bit wide address bus. For each case, frame and subframe sync word detection, the three RAMs 38, 40 and 42 are arranged so that their address input lines look at the 30 parallel input data bits supplied by the address lines 32, 34 and 36. An AND function of the RAM data outputs detects the occurrence of each sync word, the sync word bit pattern having been previously stored in the RAMs. If a sync word is less than 30-bits, the bit pattern in the RAMs can be set to allow "don't care" conditions on unused address lines. In this alternate use of memory, instead of using the RAMs for data storage and retrieval, they are used for decoding data present on the address lines.

It will be understood by those skilled in the art that the use of three multiplexers and three RAMs is dictated by the commercial availability of integrated circuits. In other words, the INTEL 2102 RAMs are provided with only a 10-bit wide address bus, and in order to use a sync word having up to 30 bits, it is necessary to use three of these integrated circuits. Obviously, if an integrated circuit RAM were available with a 30-bit wide address bus, then only one RAM would be required. Conversely, if a sync word having a bit pattern of only 10 bits were used, a single INTEL 2102 RAM would suffice.

While each of the RAMs 38, 40 and 42 provide an AND output function to detect their respective segments of the sync word, it is necessary to AND the outputs of the three RAMs to detect the entire sync word. This is accomplished by AND gate 44 which provides an output frame sync detection pulse identified as LFSYNC. This output is gated by the O°CLOCK in the AND gate 46 to provide a clocked frame sync detection pulse identified as FSYNC. These pulses are illustrated in the timing diagrams shown in FIG. 5.

The output lines of the RAMs 38, 40 and 42 are also used to enable the RAMs for a write operation from the microprocessor or computer. For this purpose, a buffer 48 composed of a 74LS367 integrated circuit is provided to connect the output/ write enable lines to the microprocessor or computer.

As will now be apparent, the frame synchronizer has an initialization and a processing mode. During initialization, the microprocessor or computer loads the sync word bit pattern into the memory array elements by memory mapping. Immediately after the memory modules are loaded, the frame synchronizer enters the processing mode. Incoming serial data is scanned continuously by presenting the data in parallel form to the address inputs of the memory arrays. A sync word is detected by the appropriate gating of the recognizer memory data outputs. Processing in this manner will continue until the memories are accessed by the microprocessor or computer to change the sync word bit format.

In describing FIG. 1, the assumption was made that the sync word detector illustrated detected the frame sync word and provided the outputs LFSYNC and FSYNC. It should be understood that an identical sync word detector is required for detecting the subframe sync word. The only differences between the frame sync word detector and the subframe sync word detector is the sync word bit patterns stored in the memory arrays and the resulting outputs. In the case of the subframe sync word detector, the output would be identified as LSSYNC corresponding to the output LFSYNC shown in FIG. 1. This output is illustrated in the timing diagrams shown in FIG. 6.

Figure 2:
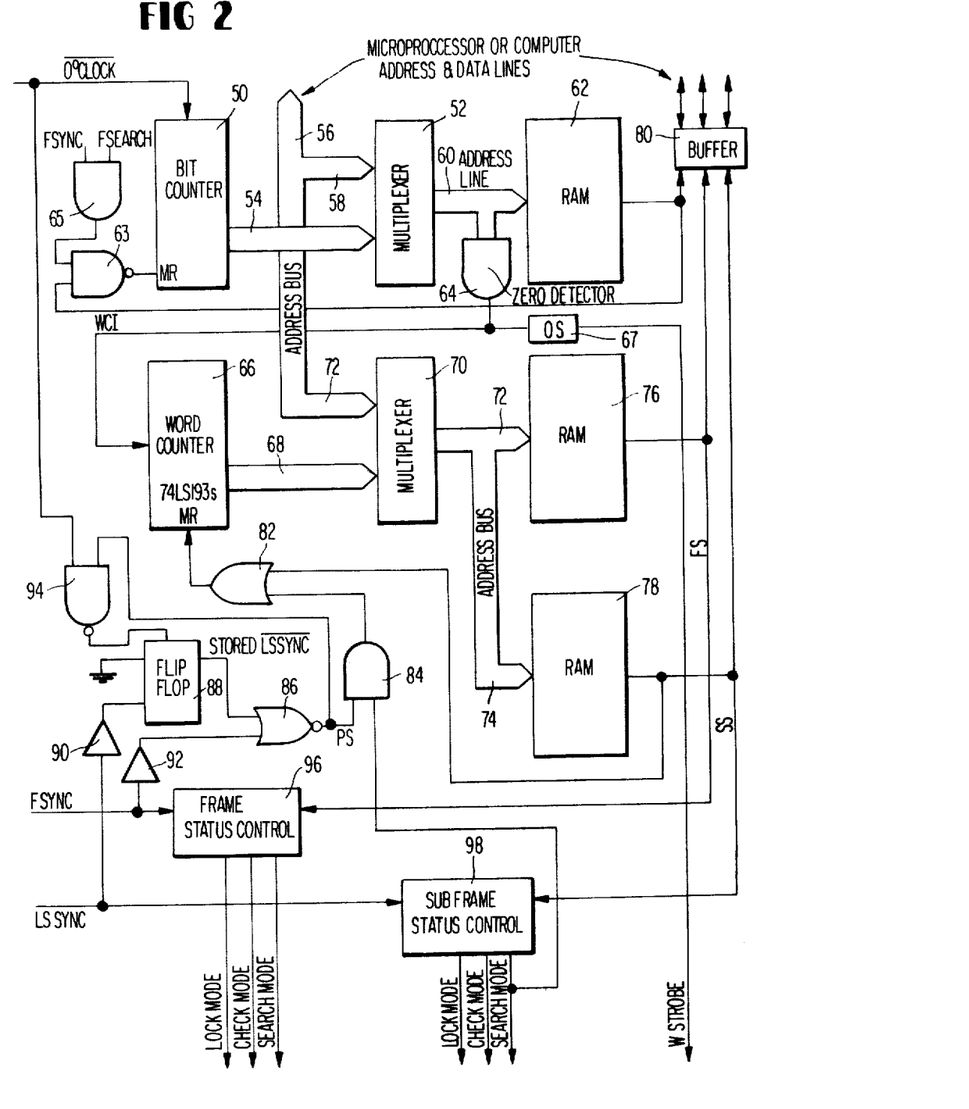
FIG. 2 is a block diagram of the control circuitry which forms another part of the memory-based frame synchronizer according to the invention.

The control circuitry in the frame synchronizer is shown in FIG. 2 and establishes telemetry word boundaries, maintains an index counter output identifying the current word within the subframe, generates a strobe signal for external peripherals defining the sampling time for the indexed data word, and maintains the status of link synchronization. The telemetry word bounderies are located using a synchronous up-counter 50 whose clock input is supplied with the $\overline{O°CLOCK}$ signal. This is a 4-bit counter having a maximum count of 16 and may be implemented using a 74LS193 integrated circuit. The output of counter 50 is supplied to one input of a 4-wide, 2-to-1 data multiplexer 52 via a 4-bit parallel bus 54. The multiplexer 52, like the multiplexers 18, 20 and 22, may be composed of 74LS257 integrated circuits, and like those multiplexers, the other input of multiplexer 52 is supplied by an address bus connected to a microprocessor or computer. More specifically, a 14-bit wide address bus 56 is divided to provide a 4-bit wide address bus 58 as one input to multiplexer 52.

The output of multiplexer 52 is connected to the address lines 60 (only four of which are used) of the RAM 62. The RAM 62, like the RAMs used in the sync word recognizers, may be an INTEL 2102 integrated circuit and has one bit set defining the word bit length. At the occurrence of the last bit, the output of RAM 62 feeds back to one input of NAND gate 63 to reset the bit counter 50. The frame sync recognizer signal FSYNC is supplied to one input of AND gate 65 the output of which is connected to the other input of NAND gate 63. The output of AND gate 65 can also reset the bit counter and thereby determine initial word synchronization. A bit counter zero-state detector 64 generates the word counter increment signal, WCI, shown in FIG. 5, for the subframe word counter 66. The zero-state detector 64 may comprise a four-input NOR gate which provides a "1" output when all four inputs are "0". The output of the zero-state detector 64 is connected to a one-shot 67 which generates the word strobe pulse, WSTROBE, also shown in FIG. 5.

Figure 5:
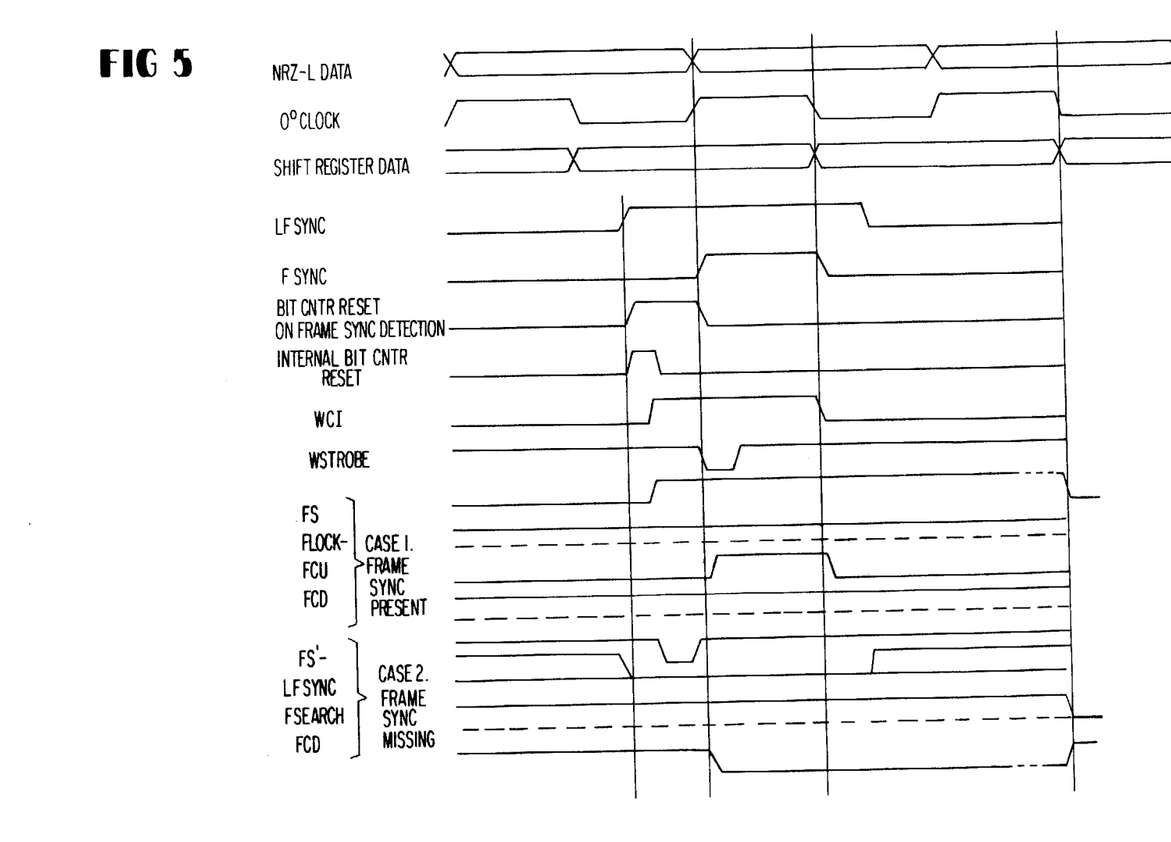
FIG. 5 is a timing diagram which illustrates frame synchronization.

The word counter 66 identifies the parallel data word currently available during the word strobe, WSTROBE, and may consist of three 74LS193 integrated circuits to form a 10-bit up-counter. The output of word counter 66 is supplied via a 10-bit parallel bus 68 to one input of a multiplexer 70. This multiplexer may also be composed of 74LS257 integrated circuits. The other input to multiplexer 70 is supplied by a 10-bit wide address bus 72 which formed part of the 14-bit parallel address bus 56.

The output of multiplexer 70 is connected to the address lines 72 and 74 of RAMs 76 and 78, respectively. Again, these RAMs may be INTEL 2102 integrated circuits. RAM 76 has several bits set defining the end of each frame within a subframe, and RAM 78 has one bit set defining the subframe length. At the occurrence of the last word strobe in each case, the RAMs 76 and 78 will provide corresponding outputs representing the expected frame sync and subframe sync pulses FS and SS, respectively. These pulses are illustrated in the timing diagrams shown in FIGS. 5 and 6, respectively.

As with the RAMs 38, 40 and 42, the address lines to the RAMs 62, 76 and 78 can be switched via the multiplexers 52 and 70 to the microprocessor or computer bus for setting the word bit length, the frame word length and the subframe word length. This is accomplished during the initialization mode by accessing the RAMs through their output/write enable lines via the buffer 80, also composed of a 74LS367 integrated circuit.

The output of RAM 78 is connected to one input of OR gate 82, the output of which is used to reset word counter 66. Thus, the word counter is reset with each output of RAM 78 which, by way of example, may be every 32 frames when the frame synchronizer is in its lock mode. The other input to OR gate 82 is supplied by AND gate 84 which is enabled when the frame synchronizer is in its search mode. The input PS to AND gate 84 is the paragraph sync identifying the first detected frame sync word following a detected subframe sync word. This input is generated by NOR gate 86 having one input connected to the $\overline{Q}$ output of D-type flip-flop 88 which is set by the output of inverter 90 connected to the output of the subframe sync detector. The output of flip-flop 88 is then the stored $\overline{LSSYNC}$ signal shown in FIG. 6. The other input to NOR gate 86 is provided by inverter 92 connected to the output of the frame sync detector. Thus, when both inputs to NOR gate 86 are "0", a "1" output will be provided to AND gate 84. This "1" output is also supplied to one input of NAND gate 94, the other input of which is supplied with the $\overline{O^\circ CLOCK}$ signal. The output of NAND gate 94 is used to reset flip-flop 88.

The various modes of operation of the frame synchronizer are determined by the frame status control logic 96 and the subframe status control logic 98. The frame status control logic 96 receives the FSYNC output from the frame sync detector and the FS output from RAM 76 and provides outputs indicating search mode, check mode or lock mode. Similarly, the subframe status control logic 98 receives the LSSYNC output from the subframe sync detector and the SS output from RAM 78 and provides outputs indicating search mode, check mode or lock mode. The search mode output of the subframe status control 98 is connected to AND gate 84.

Figure 3:
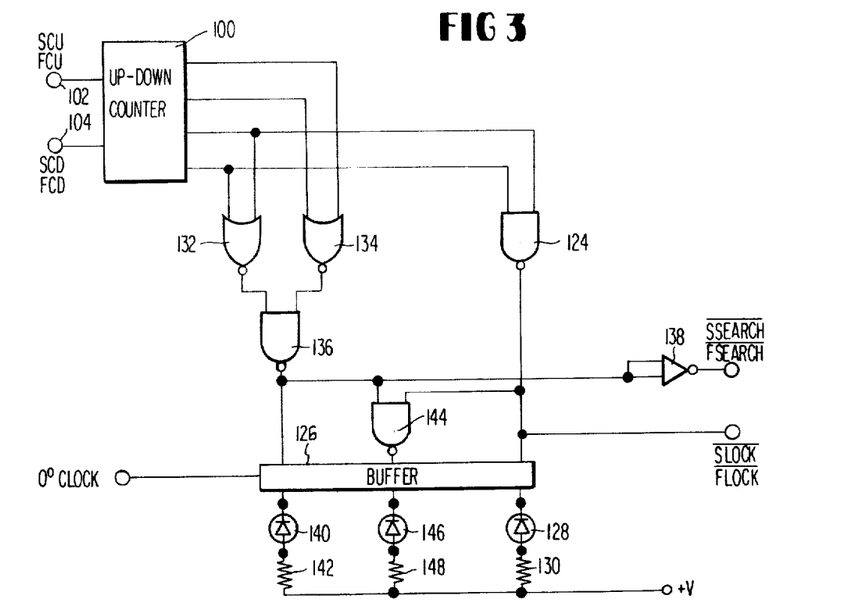
FIG. 3 is a logic diagram of the subframe or frame running status counter and status decoding circuits which are used in the control circuitry shown in FIG. 2.
Figure 4:
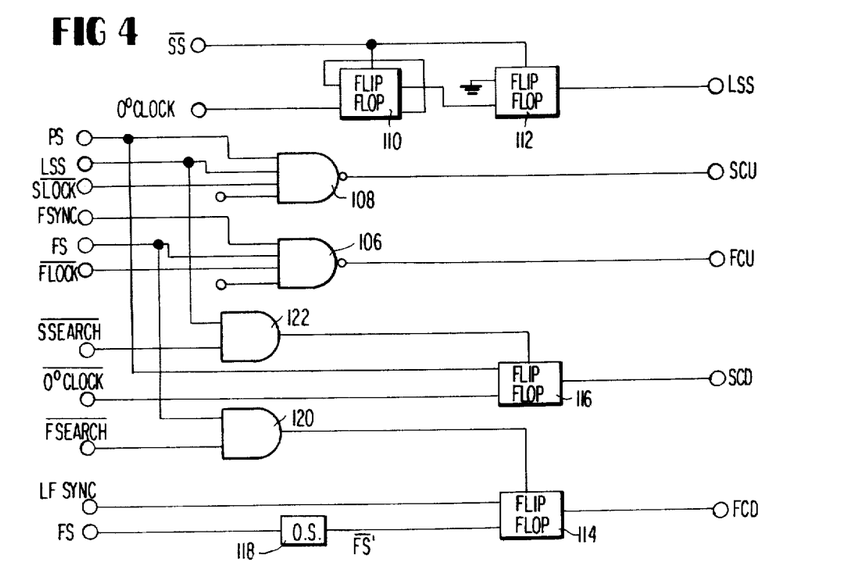
FIG. 4 is a logic diagram of the subframe and frame synchronization status control for the running status counter shown in FIG. 3.
Figure 6:
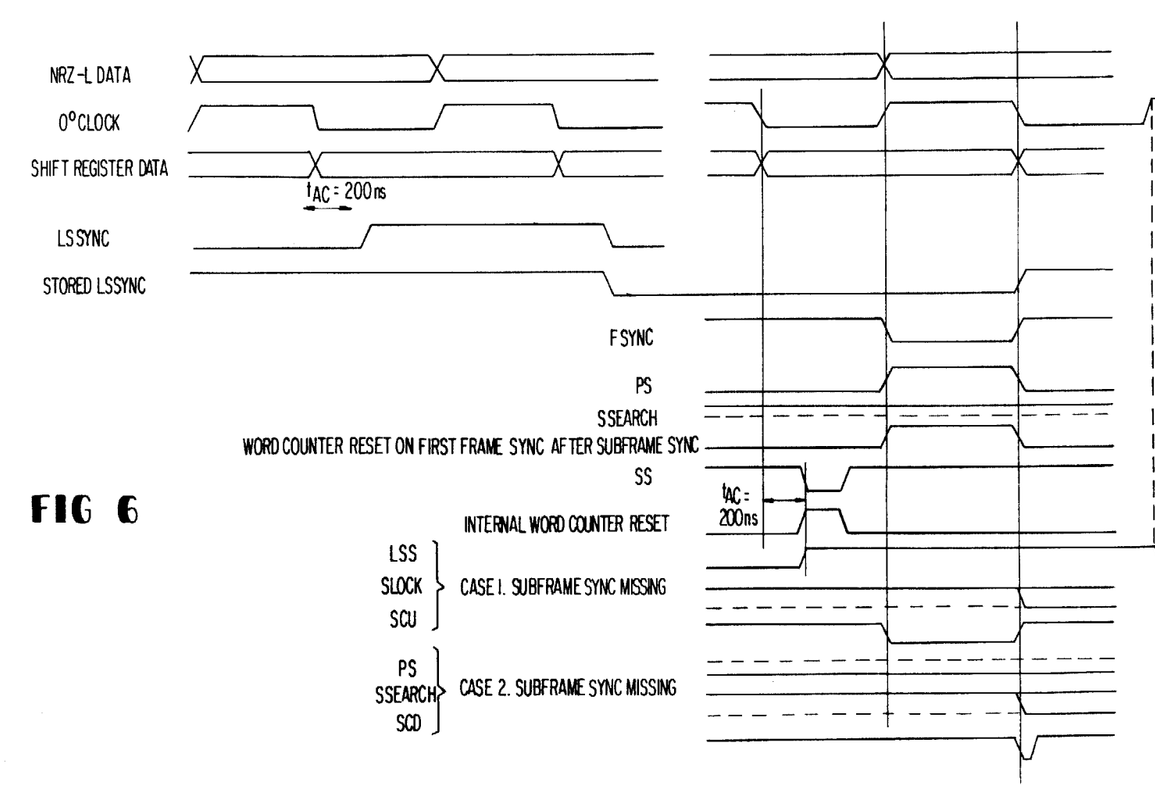
FIG. 6 is a timing diagram which illustrates subframe synchronization.

The status control logic for either the frame of subframe is shown in FIG. 3. Basically, this logic comprises an up-down counter 100 and decoding logic. The up-down counter 100 may be implemented with a 74LS193 integrated circuit. Count up pulses are supplied to input terminal 102, while count down pulses are supplied to terminal 104. In the case of the frame status control logic, the count up pulses are identified as FCU. These pulses are produced by NAND gate 106 shown in FIG. 4. The inputs to NAND gate 106 are the output FSYNC of the frame sync detector, the output FS of RAM 76 and $\overline{FLOCK}$ which is described in more detail hereinafter. In the case of the subframe status control logic, the count up pulses are identified as SCU. These pulses are produced by NAND gate 108 shown in FIG. 4. The inputs to NAND gate 108 are the output $\overline{PS}$ and the NOR gate 86, LSS which is a stretched SS signal derived from RAM 78, and $\overline{SLOCK}$ which is described in more detail hereinafter. The LSS signal is produced by a pair of D-type flip-flops 110 and 112 each of which may be composed of 74LS74 integrated circuits. FIG. 6 illustrates the LSS signal.

The count down pulses for up-down counter 100 are identified as FCD in the case of the frame status control logic and SCD in the case of the subframe status control logic. These pulses are produced by D-type flip-flops 114 and 116, respectively, both of which may again be composed of 74LS74 integrated circuits. Flip-flop 114 has one input terminal connected to receive the output LFSYNC of the frame sync detector, i.e., the output of AND gate 44. The other input is connected to the output of one-shot 118 which is in turn supplied with the output FS of RAM 76. The output produced by one-shot 118 is identified as $\overline{FS'}$ and is shown in FIG. 5. Flip-flop 114 is reset by the output of AND gate 120 which receives as inputs the output FS of RAM 76 and a signal $\overline{FSEARCH}$ which is described in more detail hereinafter. Flip-flop 116 has one input connected to the output PS of NOR gate 86, and the $\overline{O^\circ CLOCK}$ signal is supplied to the other input. Flip-flop 116 is reset by the output of AND gate 122 which has two inputs: the signal LSS produced by flip-flop 112 and a signal $\overline{SSEARCH}$ which is described in more detail hereinafter.

The up-down counter 100 is a 4-bit counter and therefore counts from 0 to 15. For the preferred embodiment, a count of twelve indicates a frame or subframe lock condition. This is decoded by NAND gate 124 which provides the output $\overline{FLOCK}$ to NAND gate 106 or the output SLOCK to NAND gate 108 depending on whether the logic shown in FIG. 3 is status control logic 96 or 98, respectively. The output of NAND gate 124 is also provided to buffer 126 which may be composed of a 74LS365 integrated circuit. The buffer 126 is clocked by the O°CLOCK signal and has an output connected to the cathode of light emitting diode (LED) 128, the anode of which is connected by resistor 130 to a source of positive voltage +V. Thus, when the lock condition is detected, LED 128 is energized to provide an indication of that fact.

The decoding logic comprising NOR gates 132 and 134 and NAND gate 136 determines if the frame synchronizer is in the search mode. The output of NAND gate 136 is provided to inverter 138, the output of which is either $\overline{FSEARCH}$ or $\overline{SSEARCH}$ to AND gates 120 and 122, respectively. The output of NAND gate 136 is also supplied to buffer 126 which, in this case, energizes LED 140 having its anode connected to the source of positive voltage +V through resistor 142 to provide an indication that the frame synchronizer is in the search mode.

The status of either frame or subframe synchronization is defined to be in search, check or lock mode. In search mode no sync words are detected. In lock mode, a running count of at least twelve sync words have been detected. In check mode, at least a running count of one sync word has been located but not more than twelve sync words have been detected. The check mode is detected by NAND gate 144 having as inputs the outputs of NAND gates 124 and 136. The output of NAND gate 144 is supplied to buffer 126 which energizes LED 146 having its anode connected to the source of positive voltage +V through resistor 148.

As shown in FIGS. 5 and 6, the maintenance of sync status depends on defining where in time to expect the next sync word. The RAMs 76 and 78 flag the expected occurrence of the next frame and subframe sync words. At the expected event of a sync word, an AND function is performed between the status outputs and the input bit stream sync word recognizer output. In the case of frame synchronization, this is performed by NAND gate 106, while in the case of subframe synchronization, this is performed by NAND gate 108. If the result is true, counter 100 is incremented; otherwise, counter 100 is decremented. Remember, there is a separate status counter 100 for frame synchronization and another for subframe synchronization. At the search and lock boundaries, the up and down counts are inhibited from reaching the status counter. The state of synchronization is determined by decoding the output value of the status counter.

The ability to change formats in real time through memory mapping allows the frame synchronizer according to the invention to handle dynamically changing formats. The invention can be applied to any serial communications environment and extends beyond strictly telemetry applications to data communications (especially packet switching) and general data communications systems.

We claim:

1. A frame synchronizer for use in a serial digital communications system, the frame synchronizer being of the type having a serial-to-parallel converter with a parallel data bus, at least one sync word comparator, a computer driven address bus, and counter and control logic circuits, wherein said sync word comparator comprises:
   a multiplexer connected to and driving a random access memory by and through address lines,
   said multiplexer having two sets of parallel inputs, one set being connected to said parallel data bus which may contain a desired sync word and the other set being connected to said address bus which transmits said desired sync word, said multiplexer periodically outputting said desired sync word and normally outputting data from said parallel data bus, and
   said random access memory providing a unique logic output upon receiving the desired sync word from said multiplexer.

2. The frame synchronizer as recited in claim 1 wherein said counter and control logic circuits comprise:
   a counter for counting clock pulses synchronized with an incoming serial data stream,
   a second multiplexer having two sets of parallel inputs, one set being connected to the output of said counter and the other set being connected to a second address bus accessible by a desired word bit length data source,
   a second random access memory having address lines connected to the output of said second multiplexer for receiving the output of said counter and providing an output when the output of said counter corresponds to the address of a bit set in said second random access memory, said second random access memory being enabled by said word bit length data source to allow a bit to be set at a different address in said second random access memory via said second address bus, and
   logic means responsive to the outputs of the first and second random access memories for detecting frame synchronization.

3. A frame synchronizer for use in a serial digital communications system, the frame synchronizer being of the type having a serial-to-parallel converter for converting an input serial data stream to a constantly changing parallel data output trasmitted over a parallel data bus, a frame sync word comparator connected to receive said parallel data output and provide an output when said parallel data output matches a sync word bit pattern furnished by a first computer driven address bus, and counter and control logic receiving a clock signal synchronized with said input serial data stream and the output of said sync word comparator, wheren said sync word comparator comprises:
   a first multiplexer connected to and driving a first random access memory by and through address lines,
   said first multiplexer having two sets of parallel inputs, one set being connected to said parallel data bus which may contain a said sync word bit pattern and the other set being connected to said first address bus, said multiplexer periodically outputting said sync word bit pattern from said address bus and normally outputting data from said parallel data bus, and
   said first random access memory providing a unique output upon receiving said sync word bit pattern from said first multiplexer,
   and wherein said counter and control logic comprise:
   a bit counter for counting said clock signal,
   a second multiplexer having two sets of parallel inputs, one set being connected to the output of said bit counter and the other set being connected to a second address bus accessible by said data processing device,
   a second random access memory having address lines connected to the output of said second multiplexer for receiving the output of said bit counter and providing an output when the output of said bit counter corresponds to the address of a bit set in said second random access memory, the output of said second random access memory resetting said bit counter,
   a word counter for counting the outputs of said second random access memory,
   a third multiplexer having two sets of parallel inputs, one set being connected to the output of said word counter and the other set being connected to said second address bus,
   a third random access memory having address lines connected to the output of said third multiplexer for receiving the output of said word counter and providing an output when the output of said word counter corresponds to the address of a bit set in said third random access memory, said second and third random access memories being enabled by said data processing device to allow bits to be set at different addresses in said second and third random access memories via said second address bus, and logic means responsive to the outputs of said first and third random access memories for detecting frame synchronization.

4. A frame synchronizer for use in a serial digital communications system wherein data are divided into frames composed of a plurality of words and subframes composed of a plurality of frames, the frame synchronizer being of the type having a serial-to-parallel converter for converting an input serial data stream to a constantly changing parallel data output transmitted over a parallel data bus, a frame sync word comparator and a subframe sync word comparator each connected to receive said parallel data output and provide an output when said parallel data output matches a frame or subframe sync word bit pattern furnished by a first computer driven address bus, and counter and control logic receiving a clock signal synchronized with said input serial data stream and the outputs of said frame and subframe sync word comparators, wherein said frame sync word comparator comprises:

a first multiplexer connected to and driving a first random access memory by and through address lines, said first multiplexer having two sets of parallel inputs, one set being connected to said parallel data bus which may contain said frame sync word bit pattern and the other set being connected to said first address bus, said first multiplexer periodically outputting said frame sync word bit pattern from said first address bus and normally outputting data from said parallel data bus, and said first random access memory providing a unique output upon receiving said frame sync word bit pattern from said first multiplexer, wherein said subframe sync word comparator comprises:

a second multiplexer connected to and driving a second random access memory by and through address lines, said second multiplexer having two sets of parallel inputs, one set being connected to said parallel data bus which may contain said subframe sync word bit pattern and the other set being connected to said first address bus, said second multiplexer periodically outputting said subframe sync word bit pattern from said first address bus and normally outputting data from said parallel data bus, and said second random access memory providing a unique output enabled by said data processing device to allow new frame and subframe sync words supplied via said first address bus to be stored in said first and second random access memories, respectively, upon receiving said subframe sync word bit pattern from said second multiplexer, and wherein said counter and control logic comprises:

a bit counter for counting said clock signal, a third multiplexer having two sets of parallel inputs, one set being connected to the output of said bit counter and the other set being connected to a second address bus accessible by said data processing device, a third random access memory having address lines connected to the output of said third multiplexer for receiving the output of said bit counter and providing an output of said bit counter corresponding to the address of a bit set in said third random access memory, the output of said third random access memory resetting said bit counter, a word counter for counting the outputs of said third random access memory, a fourth multiplexer having two sets of parallel inputs, one set being connected to the output of said word counter and the other set being connected to said second address bus, fourth and fifth random access memories having address lines connected to the output of said fourth multiplexer for receiving the output of said word counter and providing outputs when the output of said word counter corresponds to the address of bits set in said fourth and fifth random access memories, said third, fourth and fifth random access memories being enabled by said data processing device to allow bits to be set at different addresses in said third, fourth and fifth random access memories via said second address bus, and logic means responsive to the outputs of said first, second, fourth and fift random access memories for detecting frame and subframe synchronization.

* * * * *